Aug. 17, 1926.
L. M. WAITE
1,596,132
CLUTCH MECHANISM
Filed June 26, 1925
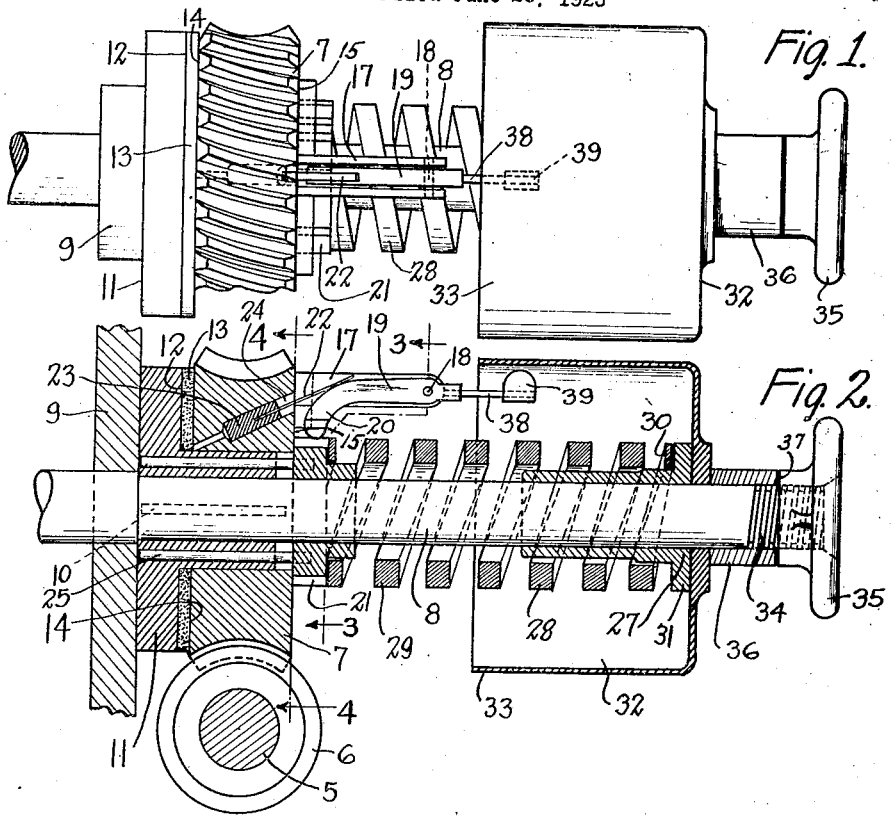
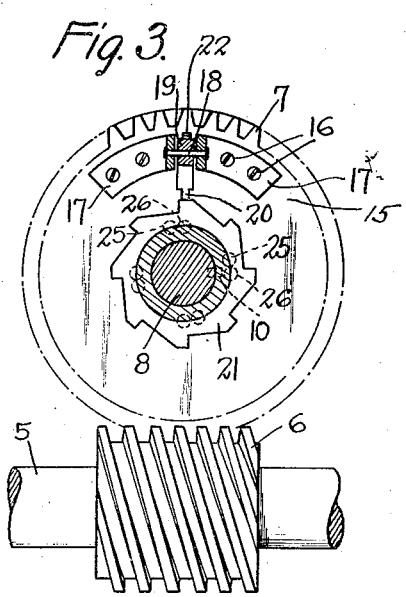
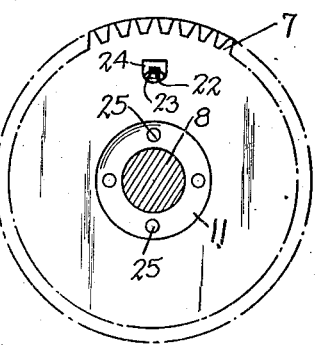
Inventor
LYMAN M. WAITE
By His Attorney
Philip C. Peck Patented Aug. 17, 1926.

1,596,132

UNITED STATES PATENT OFFICE.

LYMAN M. WAITE, OF SOUTH NORWALK, CONNECTICUT, ASSIGNOR TO HIGLEY MACHINE COMPANY, OF SOUTH NORWALK, CONNECTICUT, A CORPORATION OF NEW YORK.

CLUTCH MECHANISM.

Application filed June 26, 1925. Serial No. 39,686.

My invention relates more particularly to friction drive clutch mechanisms for transmitting motion by coupling the driving member with the driven shaft for operating the machine, more particularly machines for sawing or cutting articles of metal especially in the cold state.

The objects of my invention are, among other things, to provide novel alarm devices automatically operable with the friction drive which devices will sound variably intermittent warnings in the event of the failure or partial failure of the friction clutch members to transmit proper movements and power to the cutting tools, no matter whether such failure be due to cutting conditions, the setting of the friction drive clutch members, or the faults of the operator, or dull or damaged cutting members as are likely to happen in such cold metal sawing machines. Variations in the required amount of power may also occur owing to the character and structure of the metallic articles being cut or to failure of the necessary supply of cooling and lubricating oils or compounds, in which case my alarm devices will immediately give forth proper warnings.

With these and other objects in view, my invention consists in the novel construction, arrangement and combination of parts hereinafter described and shown in one of its embodiments in the accompanying drawings and then particularly pointed out in the appended claims.

Of the drawings, Fig. 1 is a top plan view of my improved clutch mechanism;

Fig. 2 is a vertical section of the mechanism shown in Fig. 1;
Fig. 3 is a detail section on the line 3—3 of Fig. 2; and Fig. 4 is a detail section on the line 4—4 of Fig. 2.

Similar numerals refer to similar parts throughout the several figures.

Referring to the drawings, the constantly revolving driving shaft 5 (Figs. 2 and 3) carries the worm 6 which engages with the worm gear 7 constituting the friction driving member which is rotated constantly from the shaft 5. The driven member is the shaft 8 journalled in the standard 9. Affixed to the shaft 8 by the key 10 is the sleeve 11 having a circular face 12 carrying the annular washer 13 made of leather or other compressible material adjacent the flat inner face 14 of the worm gear 7 as shown in Fig. 2. When the gear 7 is forced to the left (Fig. 2) it forms a frictional drive connection through the washer 13 and face 12 of the sleeve 11 rigidly keyed to the shaft 8 whereby a positive friction clutch connection is made between the worm gear 7 and the driven shaft 8 to drive the two members in unison.

Secured to the outer face 15 of the worm gear 7 by screws 16 are the parallel brackets 17 carrying the cross-pin 18. Pivoted on the pin 18 is the trigger 19 having its inner butt end 20 bent downwardly to ride on the teeth of the ratchet 21 loosely journalled on the shaft 8. The leaf spring 22 mounted on the block 23 slidably secured in the oblique slot 24 cut in the worm gear 7 bears on the trigger 19 to hold the butt end 20 in yielding engagement with the teeth of the ratchet 21 as shown in Figs. 2 and 3. Affixed in the sleeve 11 are a plurality of pins 25 (four in number as shown in Figs. 3 and 4) which are adapted to abut against and engage with a like number of pins 26 secured to the inner face of the ratchet 21 as shown in Figs. 2 and 3. By such pin connections the ratchet 21 is revolved at the same speed as the driven shaft 8.

Loosely journalled on the shaft 8 is the sleeve seat 27 for the compressible feed-spring 28 coiled about the shaft 8 with its inner end 29 bearing against the outer face of the ratchet 21 while its outer end 30 coacts with the flange 31 of the seat 27 as shown in Fig. 2. Sleeved on the shaft 8 is the hollow cylindrical bell 32 with its skirt 33 projecting inwardly toward the worm-gear 7 as shown in Figs. 1 and 2. The outer end of the shaft 8 is threaded at 34 on which is threaded the operating handle 35 with the collar 36 surrounding the shaft between the top of the bell 32 and annular flange 37 of the handle 35. When the handle 35 is screwed inwardly to cause the collar 36 to force the bell 32 and seat 27 to the left (Figs. 1 and 2) the spring 28 is compressed, so that its reactive tension will cause the seat 27 and bell 32 to revolve in unison with the shaft 8.

The trigger 19 carries the spring member 38 projecting outwardly or to the right in Figs. 1 and 2 with the clapper 39 affixed thereto inside the rim of the bell 32 as shown.

The operation of improved alarm device in the operation of the clutch mechanism is substantially as follows: When the operator screws down the handle 35 sufficiently to cause the worm-gear 7 to have a positive frictional grip through the washer 13 with the sleeve 11 keyed to the shaft 8, the ratchet 21 will revolve in unison with the shaft 8 as will also the seat 27 and bell 32 and the butt end 20 of the trigger 19 will rest on the teeth of the ratchet 21 without slipping. However whenever the revolutions of the shaft 8 are in any way slower than those of the worm-gear 7 due to any adverse conditions which I have described, the trigger 19 moving at the constant rate of rotation of the gear 7 will snap over the several teeth of the ratchet 21 which rotates in unison with the shaft 8. These trigger 19 reciprocations will intermittently oscillate the clapper 39 against the rim of the bell 32 with the required distinctive warning sounds from the bell. When the difference of revolutions of the worm-gear 7 and shaft 8 is but slight, the alarms will be less frequent than when the variable revolution of these driving and driven members is greater. By my improved alarm device the operator may readily understand the extent of the variation in the friction drive clutch mechanism and then easily restore same to normal operation by adjusting the handle 35 to suit the requirements.

The installation of my improved devices acts to maintain the metal sawing machine at high production capacity by announcing with insistent regularity any inefficiency either on the part of the operator, or of the cutting tool in the machine; also indicating any undue cutting resistance in the metal which is overcoming the tool, or calling attention to lack of proper lubrication, or that the friction washer 13 needs replacement or adjustment to make a positive drive clutch mechanism.

It is to be understood that various changes or modifications may be made in the structural elements embodied in my improved clutch mechanism without departing from the principle and scope of my invention as set forth in the appended claims.

I claim as my invention:

1. In a clutch mechanism, driving and driven elements having cooperating clutch members, means for maintaining said clutch members in engagement for unitary rotation, an alarm bell, a ratchet carried by the driven element, means comprising a ratchet-actuated trigger mounted on the driving clutch member to strike said bell whenever said driven element is rotated more slowly than said driving clutch member.

2. In a clutch mechanism, driving and driven elements having cooperating clutch members, means for maintaining said clutch members in engagement for unitary rotation, an alarm bell, a ratchet carried by the driven element, means comprising a ratchet-actuated trigger mounted on the driving clutch member to strike said bell with variably spaced blows whenever said driven element is variably rotated more slowly than said driving clutch member.

3. In combination, a driving member, a driven shaft, an intermediate clutch including means to bring the clutch into operative position, an alarm device carried concentrically with the driven member, a therewith coacting trigger mounted on said driving member within said alarm device, and means for automatically actuating said trigger to sound the alarm depending on the differential rotation of said driving and driven members.

4. In combination, a driving member, a driven shaft, an intermediate clutch including means to bring the clutch into operative position, an alarm device carried concentrically with the driven member, a therewith coacting trigger mounted on said driving member within said alarm device, and means for automatically and variably actuating said trigger to sound the alarm depending on the variable differential rotation of said driving and driven members.

LYMAN M. WAITE.